(12) United States Patent
Beach et al.

(10) Patent No.: US 12,606,390 B2
(45) Date of Patent: Apr. 21, 2026

(54) SYSTEM AND METHOD FOR BULK TRANSFER-BASED CONTAINER UNLOADING

(71) Applicant: ZEBRA TECHNOLOGIES CORPORATION, Lincolnshire, IL (US)

(72) Inventors: Robert E. Beach, Los Altos, CA (US); Charles Burton Swope, Coral Springs, FL (US)

(73) Assignee: Zebra Technologies Corporation, Lincolnshire, IL (US)

( * ) Notice: Subject to any disclaimer, the term of this patent is extended or adjusted under 35 U.S.C. 154(b) by 870 days.

(21) Appl. No.: 17/900,659

(22) Filed: Aug. 31, 2022

(65) Prior Publication Data

US 2023/0137246 A1 May 4, 2023

Related U.S. Application Data

(60) Provisional application No. 63/275,848, filed on Nov. 4, 2021.

(51) Int. Cl.
B65G 67/24 (2006.01)

(52) U.S. Cl.
CPC .................................... B65G 67/24 (2013.01)

(58) Field of Classification Search
CPC ...................................................... B65G 67/24
See application file for complete search history.

(56) References Cited

U.S. PATENT DOCUMENTS

| | | | | |
|---|---|---|---|---|
| 8,651,794 | B2 * | 2/2014 | Pippin | B65G 67/24 414/797.6 |
| 9,650,215 | B2 * | 5/2017 | Girtman | B25J 9/1679 |
| 9,688,489 | B1 * | 6/2017 | Zevenbergen | B25J 11/00 |
| 9,744,669 | B2 * | 8/2017 | Wicks | B25J 9/1687 |
| 10,035,657 | B2 * | 7/2018 | Hartmann | B65G 21/14 |
| 11,702,302 | B2 * | 7/2023 | Wilson | B65G 65/005 700/230 |
| 2017/0190054 | A1 * | 7/2017 | McCollum | B25J 15/0052 |
| 2019/0315582 | A1 * | 10/2019 | Criswell | B25J 5/007 |
| 2023/0106572 | A1 * | 4/2023 | Allen | B25J 9/0093 700/225 |
| 2024/0327144 | A1 * | 10/2024 | Smith | B65G 47/917 |
| 2025/0206551 | A1 * | 6/2025 | Almers | B65G 61/00 |

* cited by examiner

*Primary Examiner* — Patrick H Mackey

(57) ABSTRACT

A system for unloading items from a container includes: a movable chassis configured for deployment into an open end of the container, to a selectable depth within the container; a conveyor supported by the movable chassis, the conveyor configured to extend from an input end positioned within the container according to the selectable depth to a output end external to the container; and a bulk transfer assembly supported by the movable chassis at the selectable depth and an adjustable height, the bulk transfer assembly including: (i) a feeder configured to engage with the items and displace a portion of the items towards the conveyor, and (ii) a collector configured to receive and direct the displaced items to the input end of the conveyor for transport to the output end of the conveyor.

18 Claims, 10 Drawing Sheets

SYSTEM AND METHOD FOR BULK TRANSFER-BASED CONTAINER UNLOADING

CROSS-REFERENCE TO RELATED APPLICATIONS

This application claims priority to U.S. Provisional Patent Application No. 63/275,848 filed on Nov. 4, 2021, the entire contents of which is incorporated herein by reference.

BACKGROUND

Storage containers used for transporting items, such as trailers, shipping containers, and the like, can hold items with widely varying attributes (e.g., weight, dimensions, and the like). During transportation and handling operations, the items may be unloaded from a container, for processing at a facility, loading onto other containers, and the like. The variety of attributes of items in a container, and the varying physical arrangement of the items within the container, can render unloading of the container a complex operation that is difficult to mechanize.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
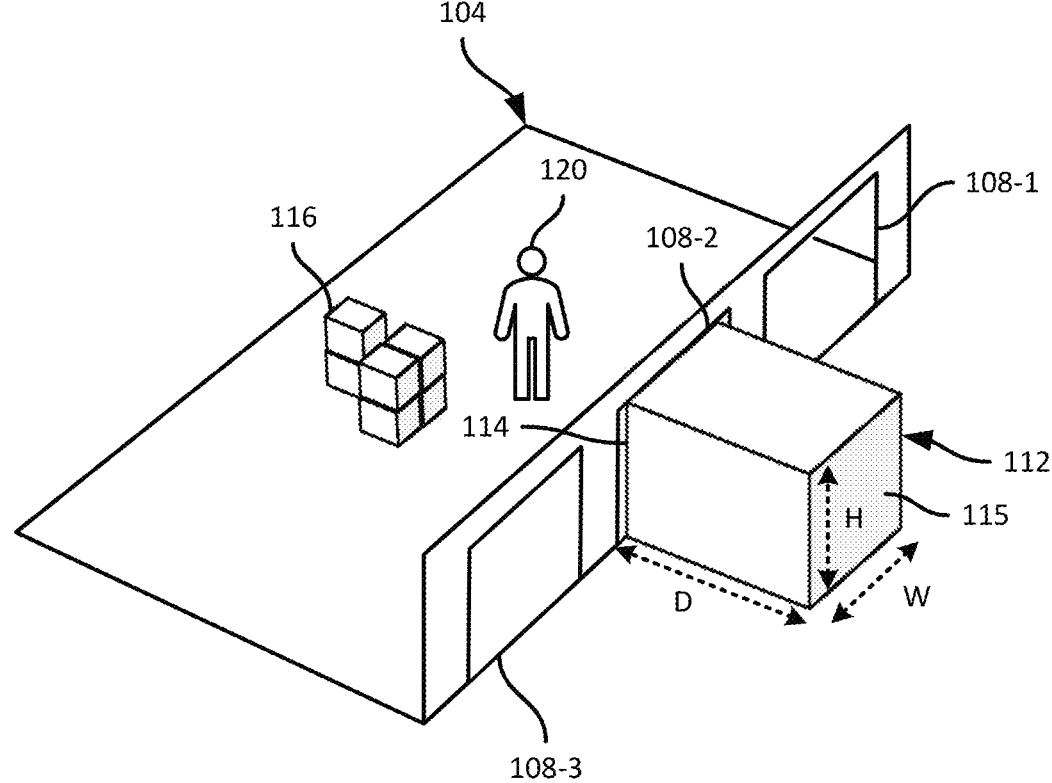
FIG. 1 is a diagram of an item handling facility.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Examples disclosed herein are directed to a system for unloading items from a container, the system comprising: a movable chassis configured for deployment into an open end of the container, to a selectable depth within the container; a conveyor supported by the movable chassis, the conveyor configured to extend from an input end positioned within the container according to the selectable depth to an output end external to the container; and a bulk transfer assembly supported by the movable chassis at the selectable depth and an adjustable height, the bulk transfer assembly including: (i) a feeder configured to engage with the items and displace a portion of the items towards the conveyor, and (ii) a collector configured to receive and direct the displaced items to the input end of the conveyor for transport to the output end of the conveyor.

Additional examples disclosed herein are directed to a method, including: controlling a camera to capture an image of an aggregation of items in a container; detecting a forward surface and an upper surface of the aggregation of items from the image; positioning a movable chassis at a selectable depth within the container according to the detected forward surface and the detected upper surface; positioning a bulk transfer assembly to a selected height according to the detected upper surface; activating a feeder of the bulk transfer assembly to displace items onto a collector towards a conveyor; and activating the conveyor to transfer the displaced items from the container.

FIG. 1 depicts an item handling facility 104 (e.g., a warehouse, manufacturing facility, retail facility, transit facility such as an airport, or the like, a portion of which is illustrated in FIG. 1) with at least one load bay 108. As illustrated, the facility 104 includes a portion of a building, such as a cross dock or portion thereof, including load bays 108. In the illustrated example, three load bays 108-1, 108-2, and 108-3 are shown (collectively referred to as load bays 108, and generically referred to as a load bay 108; similar nomenclature may also be used for other components herein). The load bays 108 may, for example, be arranged along an outer wall of the facility 104, such that containers 112 can approach the load bays 108 from the exterior of the facility 104. In other examples, smaller or greater numbers of load bays 108 may be included. The load bays 108 are illustrated as being dock structures enabling access from within the facility 104 to an exterior of the facility 104 where a container 112 is positioned. In other examples, one or more of the load bays 108 may be implemented as a load station within the facility 104, to load or unload containers that are handled inside the facility 104.

Each load bay 108 is configured to accommodate a container 112, an example of which is shown positioned at the load bay 108-2 in FIG. 1. The container 112 can be, for example, a semi-trailer including an enclosed box affixed to a platform including one or more sets of wheels and a hitch assembly for towing by a powered vehicle. In further examples, the container 112 may be the box portion of a box truck in which the container 112 is affixed to the body of the vehicle which also supports a cab, powertrain, and the like. In other examples, the container 112 can be a unit loading device (ULD) of the type employed to load luggage, freight and the like into aircraft. The container has a substantially horizontal internal depth "D", extending from an open end 114 (e.g., a wall with a door or other opening allowing access to an interior of the container 112) of the container 112 to a closed end 115, a substantially horizontal internal width "W" perpendicular to the depth D, and a substantially vertical internal height "H".

Each load bay 108 includes an opening, e.g., in a wall of the facility 104, that enables staff and/or equipment within the facility 104 to access an interior of the container 112. For example, once the container 112 is placed at the load bay 108-2 as shown in FIG. 1, e.g., with the open end 114 of the container substantially flush with the opening of the load bay 108-2, items can be unloaded from the container 112, e.g., to a staging area for unloaded items 116, for processing within the facility 104. In some examples, the facility 104 includes one or more conveyor belts or other item transport mechanisms (not shown) to transport items unloaded from the container 112 to other locations within the facility 104.

The nature of the items in the container 112 can vary widely. For example, a container 112 used to transport parcels for residential delivery may contain items with a variety of physical forms, including boxes, envelopes, bags, and the like. Further, the dimensions and weights of the items in the container 112 can vary greatly, e.g., from envelopes or small bags to items sufficiently large and/or heavy as to require more than one person to unload. Still further, the container 112 may contain a large number (e.g., hundreds or thousands) of items, and the time available to unload the container may be constrained, e.g., due to the impending arrival of another container 112 at the load bay 108-2.

At least in part because of the factors set out above, unloading containers 112 can be time-consuming and physically demanding. Each load bay 108 may be staffed by several workers 120 to provide sufficient unloading capacity to meet the time constraints mentioned above, and/or to remove large and/or heavy items that may not be readily unloaded by one worker 120. Exposure of the load bays 108 to the exterior of the facility 104 can also result in harsh environmental conditions within the containers 112 (e.g., extreme heat or cold, humidity, and the like).

While the physically demanding and time-consuming nature of the unloading process may be mitigated by mechanizing unloading of the containers 112, mechanization is complicated by the widely varying nature of the items in the containers 112, as well as the arrangement of the items within the containers 112. For example, some items may be stacked in regular walls within the containers 112, but other items may be in piles or other unstructured arrangements, such that robotic grasping arms or the like may be unable to consistently identify and grasp specific items. The widely varying shapes, weights, and the like, of the items may also impede the autonomous or semi-autonomous identification and unloading of items by systems reliant on robotic arms or other manipulators.

Figure 2:
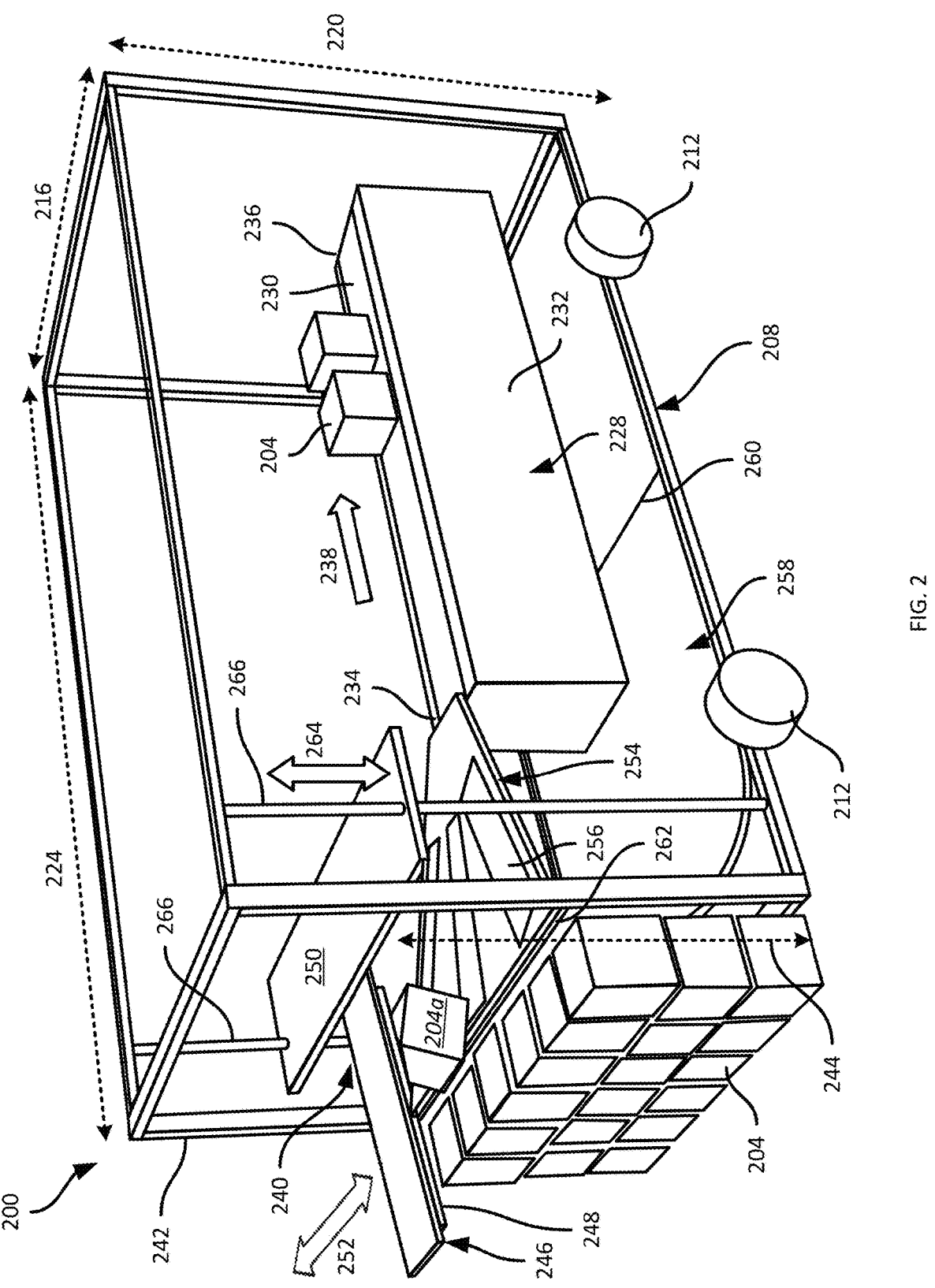
FIG. 2 is a perspective view of a system for container unloading.

FIG. 2 illustrates a system 200 for bulk transfer-based unloading of containers 112, that facilitates mechanized or partially mechanized unloading of items 204 from a container 112 (the container 112 itself is omitted from FIG. 2). Use of the system 200 may therefore reduce staffing allocations to load bays 108 (e.g., by reducing the number of workers 116 assigned to unload a given container 112).

Rather than by grasping or otherwise manipulating individual items 204, the system 200 displaces the items 204 from storage positions in the container 112 (e.g., the wall shown in FIG. 2) in bulk, without affixing items 204 to manipulation components of the system 200. The items 204 are instead displaced by certain components of the system 200, without the system 200 implementing any item-specific handling operations (e.g., grasping an item, or the like). That is, the system 200 is configured to handle the items 204 as a fungible pool of objects, rather than a set of distinct objects each necessitating specific engagement for handling.

The system 200 includes a movable chassis 208, implemented in the present example as a frame bearing a set of wheels 212, tracks, or the like that facilitate movement of the system 200 into and out of a container 112, entering via the open end 114. The wheels 212 can be powered in some examples, e.g., by one or more electric motors supported on the chassis 208. In other examples, the wheels 212 can rotate freely, and movement of the system 200 can be driven by the worker 120 or another external power source.

The chassis 208 has dimensions selected to allow entry of the chassis 208 into the container 112. Thus, in the illustrated example, the chassis 208 has a width 216 that is smaller than the width W of the container 112. In some examples, the width 216 is smaller than the width W by a relatively small threshold (e.g., about 10 cm, or about 4 inches, although various other thresholds are also contemplated). The chassis 208 has a height 220 that is smaller than the height H of the container 112, e.g., by a relatively small threshold (e.g., about 10 cm, or about 4 inches although various other thresholds are also contemplated). The above thresholds are referred to as small in comparison with the overall dimensions of the container 112, which may have a width of about 2.4 meters, or about 8 feet, and a height of about 2.8 meters, or about 9 feet. The chassis 208 also has a depth 224 that can be, but is not necessarily, smaller than the depth D of the container 112. That is, while at least a portion of the chassis 208 is accommodated within the container 112 during operation, a portion of the chassis 208 may extend outside the open end 114 of the container 112.

The chassis 208 is movable to facilitate placement of the system 200 at selectable depths within the container 112. As discussed below, the system 200 engages with the items 204 closest to the open end 114 of the container 112 (e.g., with the forward and/or uppermost surfaces of an aggregation of items 204 in the container 112). The system 200 advances further into the container 112 as such items 204 are displaced and unloaded from the container 112. Such advancement is provided by adjustments to the selectable depth at which the chassis 208 is placed within the container 112.

The system 200 also includes a conveyor assembly 228, e.g., including a belt 230 movably supported on a housing 232. The belt 230 can be driven by one or more motors or the like in the housing 232. The belt 230 extends from an input end 234 to an output end 236. When the belt 230 is driven, the conveyor assembly 228 transports items received at the input end 234 (e.g., positioned inside the container 112), in a direction 238 towards the output end 236, e.g., positioned outside the container 112. Beyond the output end 236, the facility 104 can include a system of conveyors or other transport apparatus to receive and process items unloaded from the container 112. In other examples, items 204 reaching the output end 236 can be dropped at the load bay 108 for manual handling, e.g., by the worker 120.

The system 200 further includes a bulk transfer assembly 240 supported at or adjacent to a forward end 242 of the chassis 208 (i.e., the end of the chassis 208 configured to extend into the container 112) at an adjustable height 244. The bulk transfer assembly 240 is configured to engage with the items 204, to displace the items 204 from an aggregation such as the wall of parcels shown in FIG. 2, onto the conveyor assembly 228 at the input end 234. The bulk transfer assembly 240, rather than grasping or otherwise affixing the items 204 to any component of the assembly 240, engages with surfaces of the items 204 to move the items 204 relative to the assembly 240, and relative to the remaining items 204 in the container 112.

The bulk transfer assembly 240 includes a feeder 246 configured to engage with the items 204 and displace a portion of the items 204 towards the conveyor assembly 228 (e.g., towards the input end 234 of the belt 230). In the illustrated example, the feeder 246 includes an inverted conveyor 248, referred to as inverted because the moving surface of the conveyor 248 is downwards-facing, in contrast to the upwards-facing moving surface of the belt 230. When the conveyor 248 is activated, the moving surface of the conveyor 248 moves towards the input end 234 of the conveyor assembly 228, and therefore displaces any items 204 contacting the moving surface, such as a displaced item 204a shown in FIG. 2, towards the conveyor assembly 228.

In the embodiment shown in FIG. 2, the feeder 246 has a width spanning only a fraction of the width 216 of the chassis 208. In other examples, the feeder 246 can have a width substantially equal to the width 216. In the illustrated example, the feeder 246 is movably mounted on a feeder support 250, which can include one or more actuators to slide the feeder 246 in opposite directions 252. Movement of the feeder 246 can be employed to bring the inverted conveyor 248 into contact with items 204 across the full width W of the container 112.

The bulk transfer assembly 240 further includes a collector 254 configured to receive and direct the displaced items (e.g., the item 204a) to the input end 234 of the conveyor assembly 228. The collector 254 has a forward width substantially equal to the width 216 of the chassis 208, and a rear width substantially equal to the width of the belt 230 at the input end 234. In some examples, the collector 254 can include raised walls along the sides thereof, e.g., forming a chute for the items 204 to travel along towards the input end 234. The collector 254 can include a plurality of conveyor belts 256 (three, in the illustrated example), as well as one or more motors to drive the conveyor belts 256 to transport the items 204 from the forward surface of the aggregation of items 204 in the container 112 towards the input end 234 of the conveyor assembly 228.

The bulk transfer assembly 240 can also include, in some embodiments, a movable barrier 258 configured to extend from a lower end 260 adjacent to a floor of the container 112 (i.e., adjacent to a lower plane of the chassis 208) to an upper end 262 adjacent to the collector 254. The barrier 258 is configured to stabilize an aggregation of items 204 in the container 112 below the subset of items 204 currently being engaged by the feeder 246. Displacement of the item 204a driven by the feeder 246 may also displace other items 204 below the item 204a. In the absence of the barrier 258, the wall of items 204 may partially or completely collapse because of such displacement, with some items falling below the collector 254 and therefore not being collected and transferred to the conveyor assembly 228.

The feeder 246, collector 254, and upper end 262 of the barrier 258 are height-adjustable, in opposing directions 264, e.g., by activation of one more actuators. For example, the chassis 208 can include rails 266 at either side thereof. The feeder support 250 is slidably mounted on the rails 266, and the chassis 208 can include one or more actuators configured to move the support 250 up or down the rails 266, e.g., to match a current height of the aggregation of items 204 to be engaged by the feeder 246. The collector 254 can also be slidably mounted on the rails 266, on another set of rails, or coupled to the feeder support 250 such that movement of the feeder support 250 also drives movement of the collector 254. The barrier 258 can be coupled, e.g., at or near the upper end 262, to the collector 254. The barrier 258, in the present example, is a flexible sheet disposed in tracks defined by the chassis 208 such that adjustment of the height of the upper end 262 pulls or pushes the lower end 260 towards or away from the forward end 242 of the chassis 208.

Figure 3:
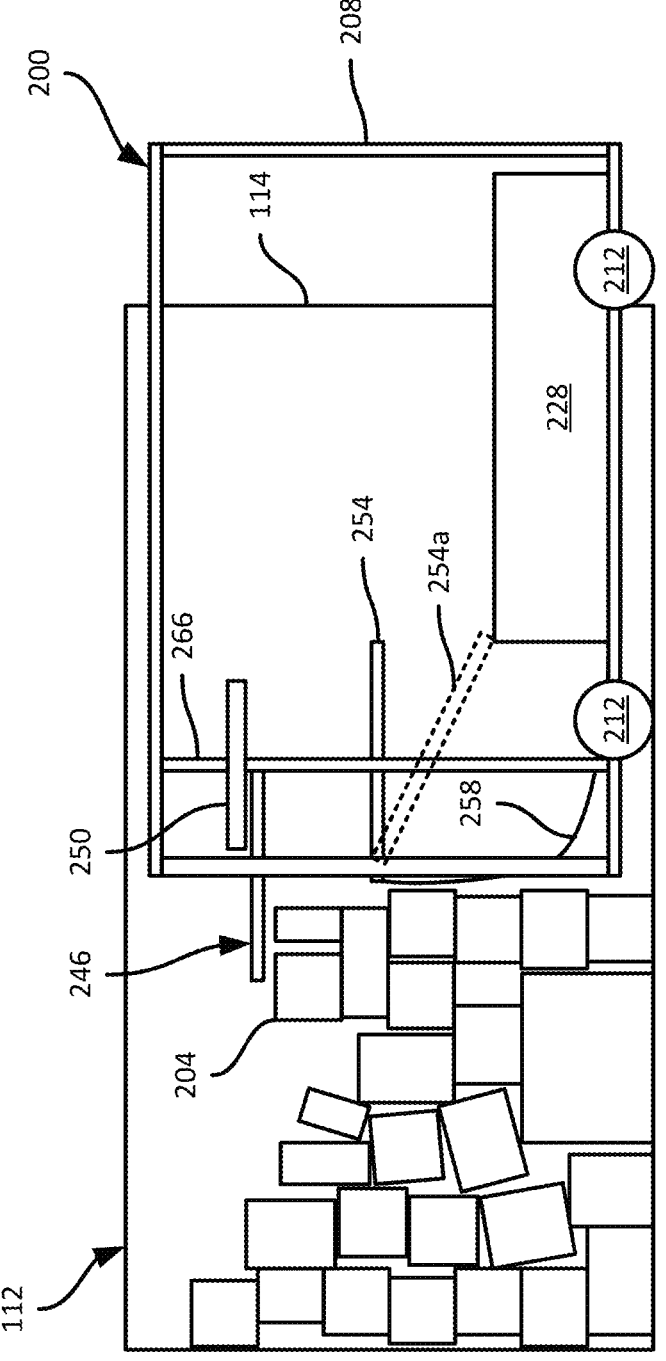
FIG. 3 is a diagram illustrating the system of FIG. 2 in operation.

Turning to FIG. 3, a simplified side view of the system 200 in use is shown. The chassis 208 is positioned within the container 112 at a depth selected to place the feeder 246 in engagement with a forward and/or upper portion of an aggregation of items 204. Activation of the feeder 246 (e.g., movement of the inverted conveyor 248) displaces items 204 from the aggregation, onto the collector 254. The items 204 are transferred by the collector 254 to the conveyor assembly 228, for transport outside the container 112. As also shown in FIG. 3, the collector 254 is positioned at an intermediate height between the feeder 246 and the conveyor assembly 228. The distance that items 204 displaced by the feeder 246 fall can therefore be limited by the collector 254, in comparison with the distance from the feeder 246 to the conveyor assembly 228. For example, the collector 254 and feeder 246 can be separated by a distance selected to accommodate the items 204, and limit the maximum fall distance of any particular item 204 to a threshold (e.g., about 0.9 meters, or about 3 feet). In other examples, the collector 254 can be rotatably coupled with the conveyor assembly 228, as indicated by an alternative collector 254a in dashed lines. In such examples, the rear end of the collector 254a remains connected with the conveyor assembly 228, while the forward end of the collector 254a is positioned at an adjustable height.

Figure 4:
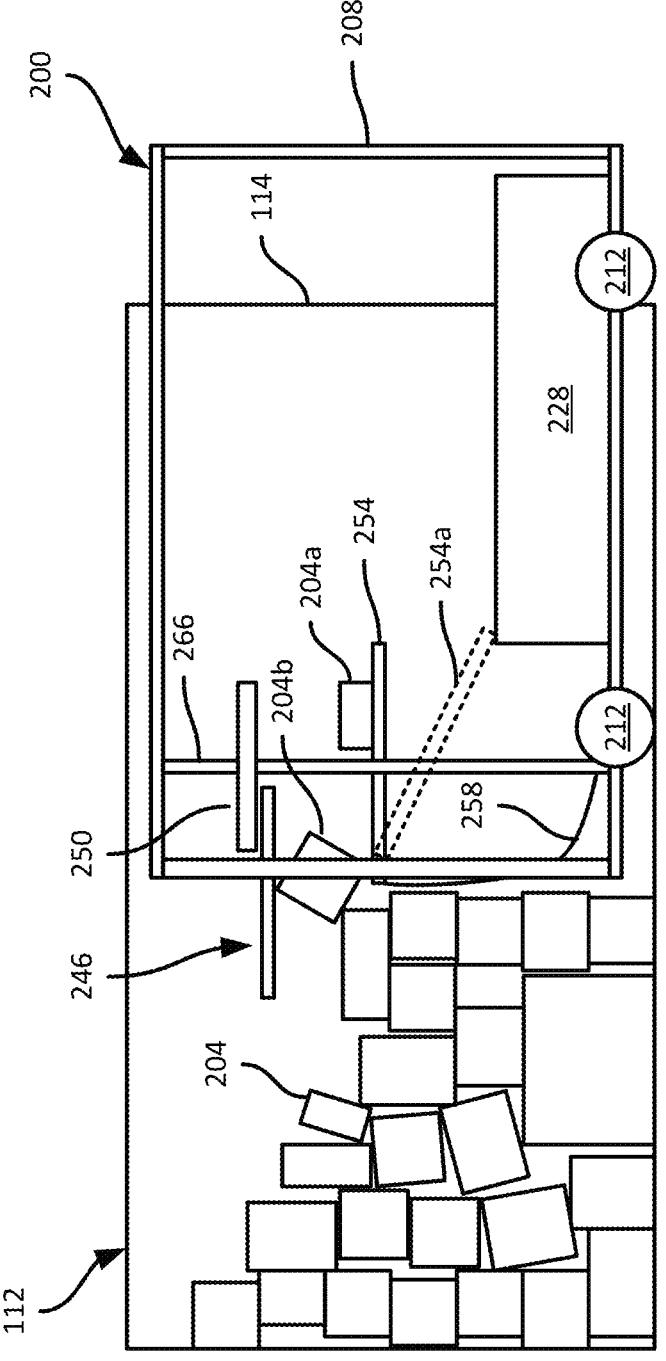
FIG. 4 is a further diagram illustrating the system of FIG. 2 in operation.
Figure 5:
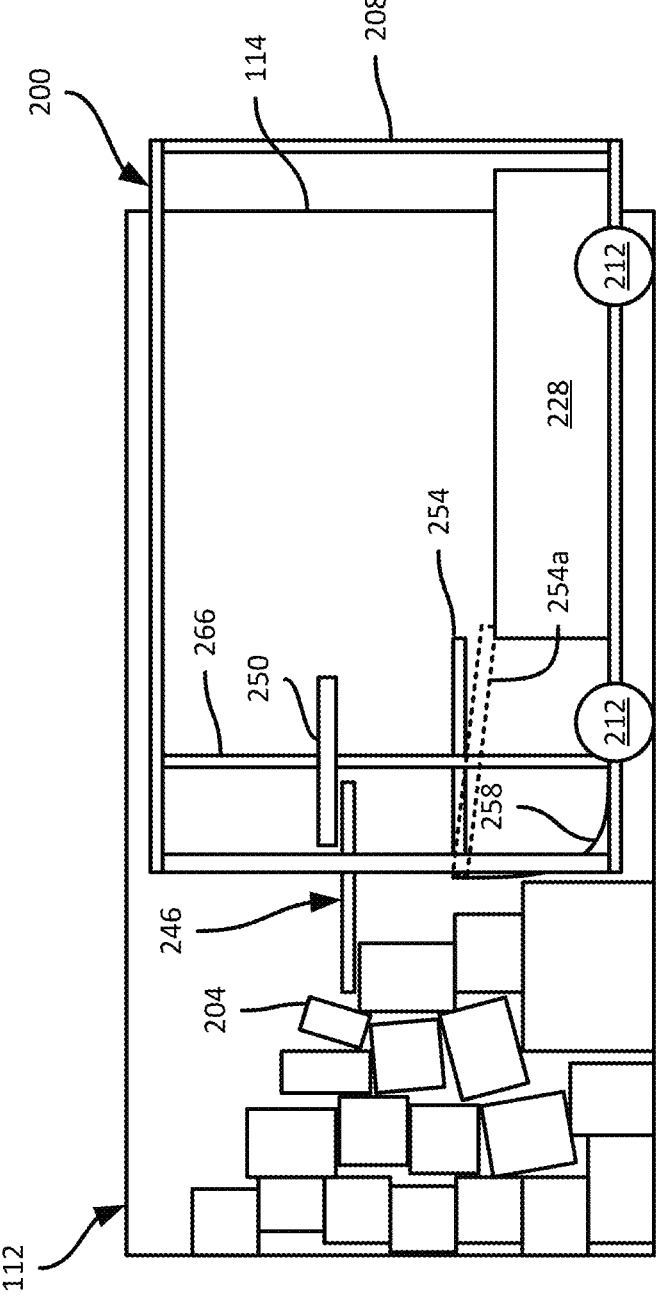
FIG. 5 is a further diagram illustrating the system of FIG. 2 in operation.

FIG. 4 illustrates the system 200 in operation, with the feeder 246 having displaced items 204a and 204b onto the collector 254, for subsequent transfer to the conveyor assembly 228 and outside the container 112. FIG. 5 illustrates the container 112 following the removal of a portion of the items 204, such that the forward and/or upper surfaces of the aggregation of items 204 (that is, the surfaces of the aggregation closest to the ceiling of the container 112, and to the open end 114) have changed. In response, the chassis 208 has been repositioned to a new depth, further into the container 112 than as shown in FIGS. 3 and 4. In addition, the height of the feeder 246, collector 254, and barrier 258 have been adjusted to place the feeder 246 into engagement with the current forward, upper surface of the aggregation of items 204 remaining in the container 112. As further items 204 are unloaded by the system 200, further depth wise and height wise adjustment of the chassis 208 and bulk transfer assembly 240, respectively, can be performed.

Figure 6:
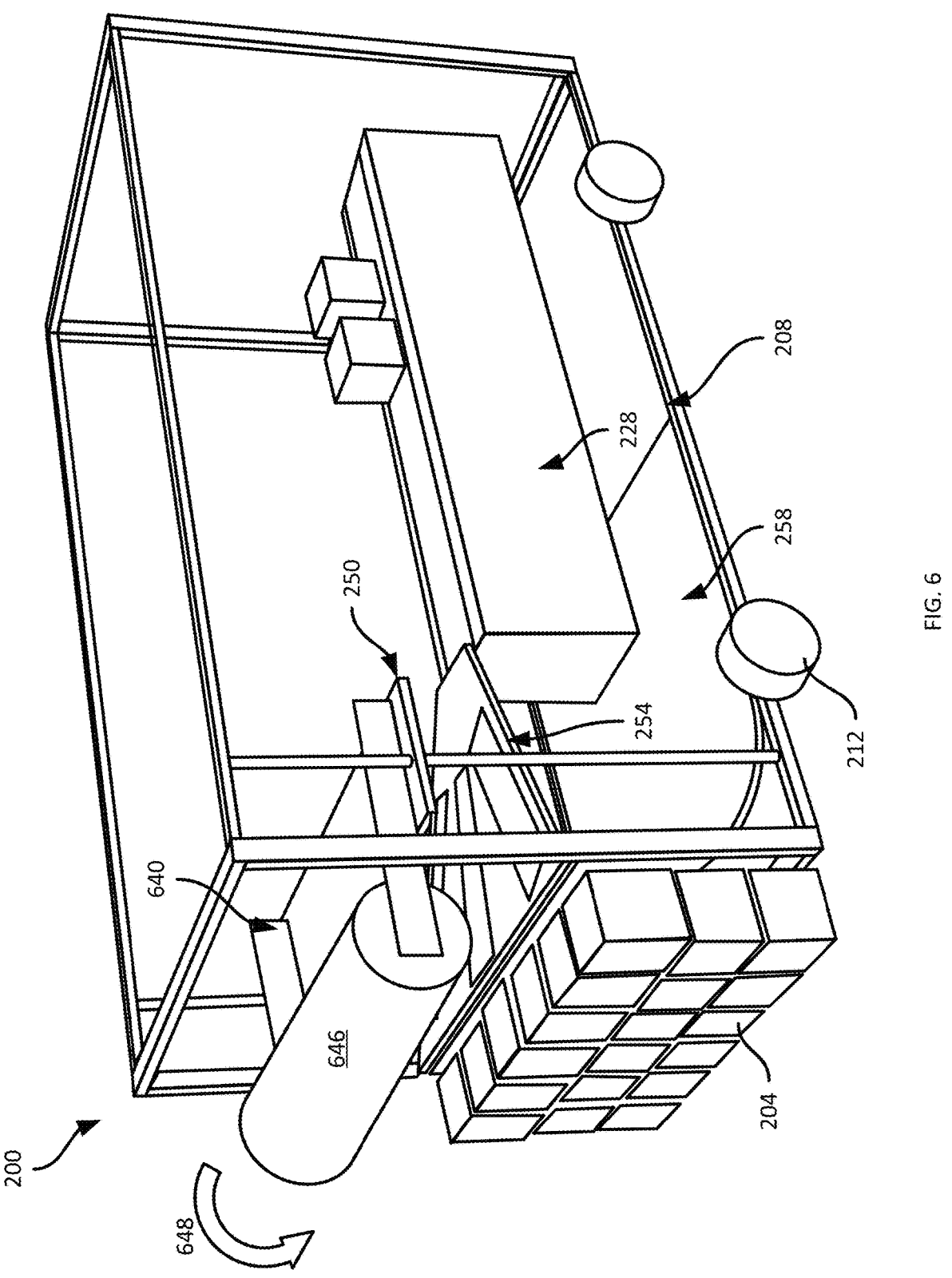
FIG. 6 is a perspective view of another example system for container unloading.

Turning to FIG. 6, another example embodiment of the system 200 is shown, with a modified bulk transfer assembly 640 in place of the bulk transfer assembly 240 shown in FIGS. 2, 3, 4, and 5. The bulk transfer assembly 640 includes the collector 254 and barrier 258 as described above. Instead of the feeder 246, however, the assembly 640 includes a feeder 646, implemented as a roller (e.g., a cylindrical brush, or the like) mounted on the support 250. The roller 646 is configured to rotate in a direction 648 to engage with forward and/or upper surfaces of the items 204 and displace the items 204 onto the collector 254. As shown in FIG. 6, the roller 646 extends substantially across the entire width of the chassis 208. In other examples, however, the roller 646 can have a reduced width compared to that illustrated in FIG. 6, and can be movable sideways, as discussed above in connection with the feeder 246.

Figure 7:
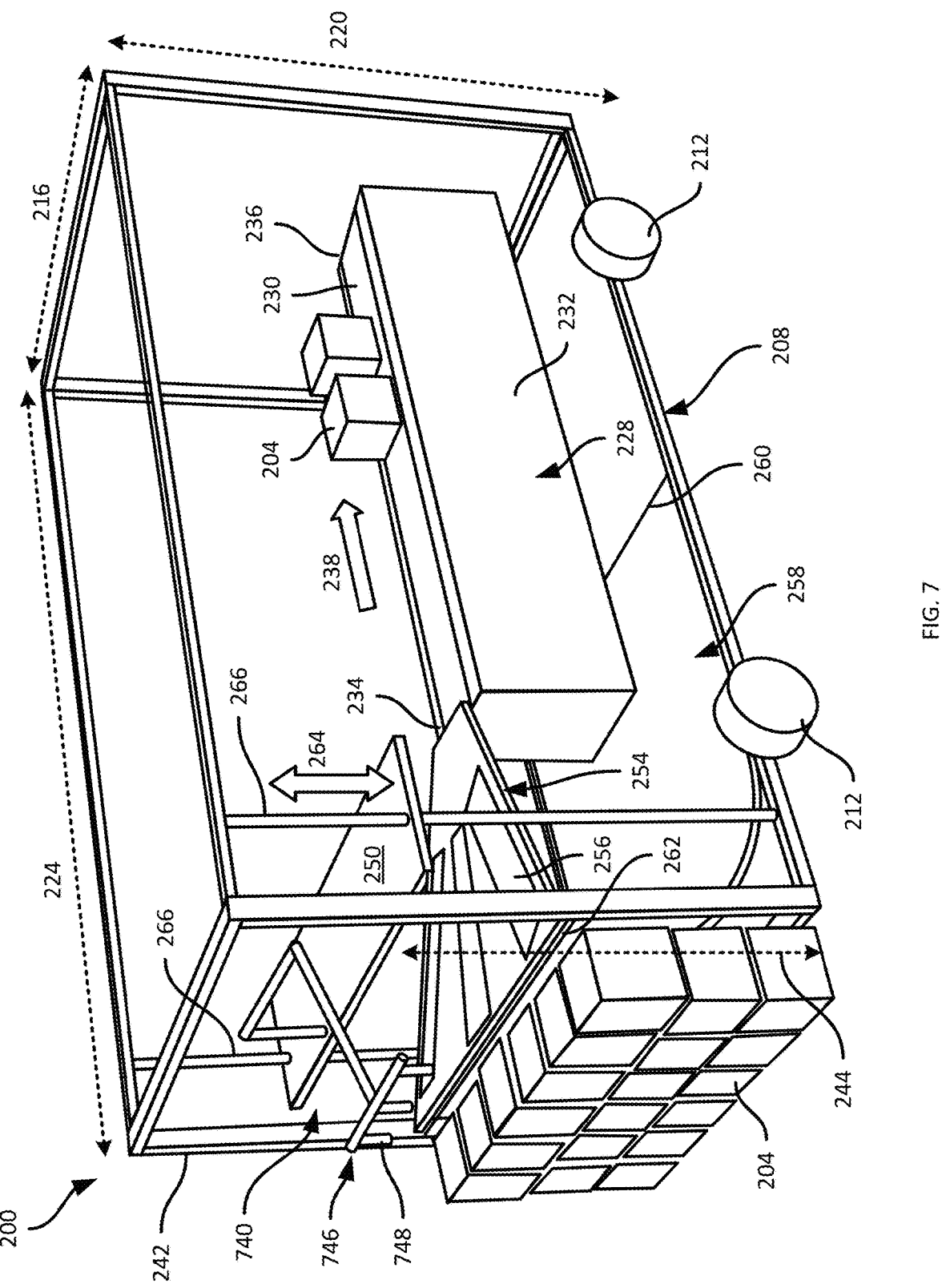
FIG. 7 is a perspective view of a further example system for container unloading.

FIG. 7 illustrates a further example bulk feed assembly 740, including a reciprocating arm 746 instead of the feeder 246 or the roller 646. The arm 746 can include a rake 748 or other suitable effector to engage with the items 204, disposed at the end of the arm 746. The arm 746 can be articulated, and controlled to lift the rake 748 over or onto the items 204, and pull the items 204 towards the collector 254.

Figure 8:
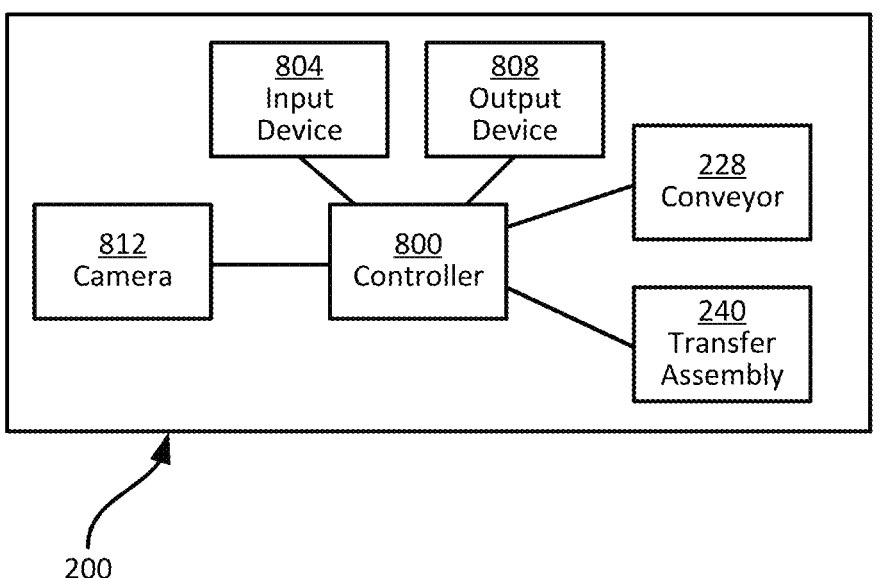
FIG. 8 is a diagram illustrating certain internal components of the system of FIG. 2.

FIG. 8 is a block diagram illustrating certain components of the system 200. The system 200, as shown in FIG. 8, includes a controller 800, such as a central processing unit (CPU), graphics processing unit (GPU), or combination thereof, coupled with the conveyor assembly 228 and the bulk transfer assembly 240. The conveyor assembly 228 and the bulk transfer assembly 240 can each include multiple motors, actuators, and the like, and the controller 800 can be configured to enable those motors and/or actuators to set the adjustable height of the bulk transfer assembly 240 and activate the feeder 246 (or other suitable feeders, such as those shown in FIGS. 6 and 7). The controller 800 can also be configured to enable motors driving the conveyors 256 of the collector 254, as well as motors driving the conveyor belt 230 of the conveyor assembly 228.

In addition, the system 200 can include an input device 804, such as a keypad, joystick, touch screen, or the like, for receiving operator input (e.g., from the worker 120) and providing such input to the controller 800. The system 200 can therefore, in some examples, be operated manually, and/or provide manual override functionality. The system 200 further includes an output device 808, such as a display, an indicator light, a speaker, or the like, configured to generate notifications or other signals, e.g., to indicate a status of the system 200 to the worker 120.

The system 200 can also include a camera (e.g., a color camera, depth camera, laser scanner, or the like) with a field of view extending forward of the chassis 208 to observe the aggregation of items 204 in the container 112. The controller 800 can be configured to process images captured by the camera to detect items 204 therein and control the bulk transfer assembly 240 and/or conveyor assembly 228 according to the positions of the detected items 204. In some examples, the controller 800 can also detect exceptions, such as items 204 that are not compatible with the system 200 and may therefore necessitate manual unloading. Examples of such items include large and/or heavy items. Such items 204 can represent a subset of items referred to as "non-conveyables", which include items with dimensions, weights, and/or other attributes (e.g., fragile items) that render the items 204 incompatible with conveyor systems. The system 200 may accommodate certain non-conveyable items, but other non-conveyable items may be sufficiently large and/or heavy, for example, to resist displacement by the feeder 246. The controller 800 can therefore, in some examples, process images from the camera 812 to detect such items and generate notifications via the output device 808, for such items to be handled by the worker 120.

Figure 9:
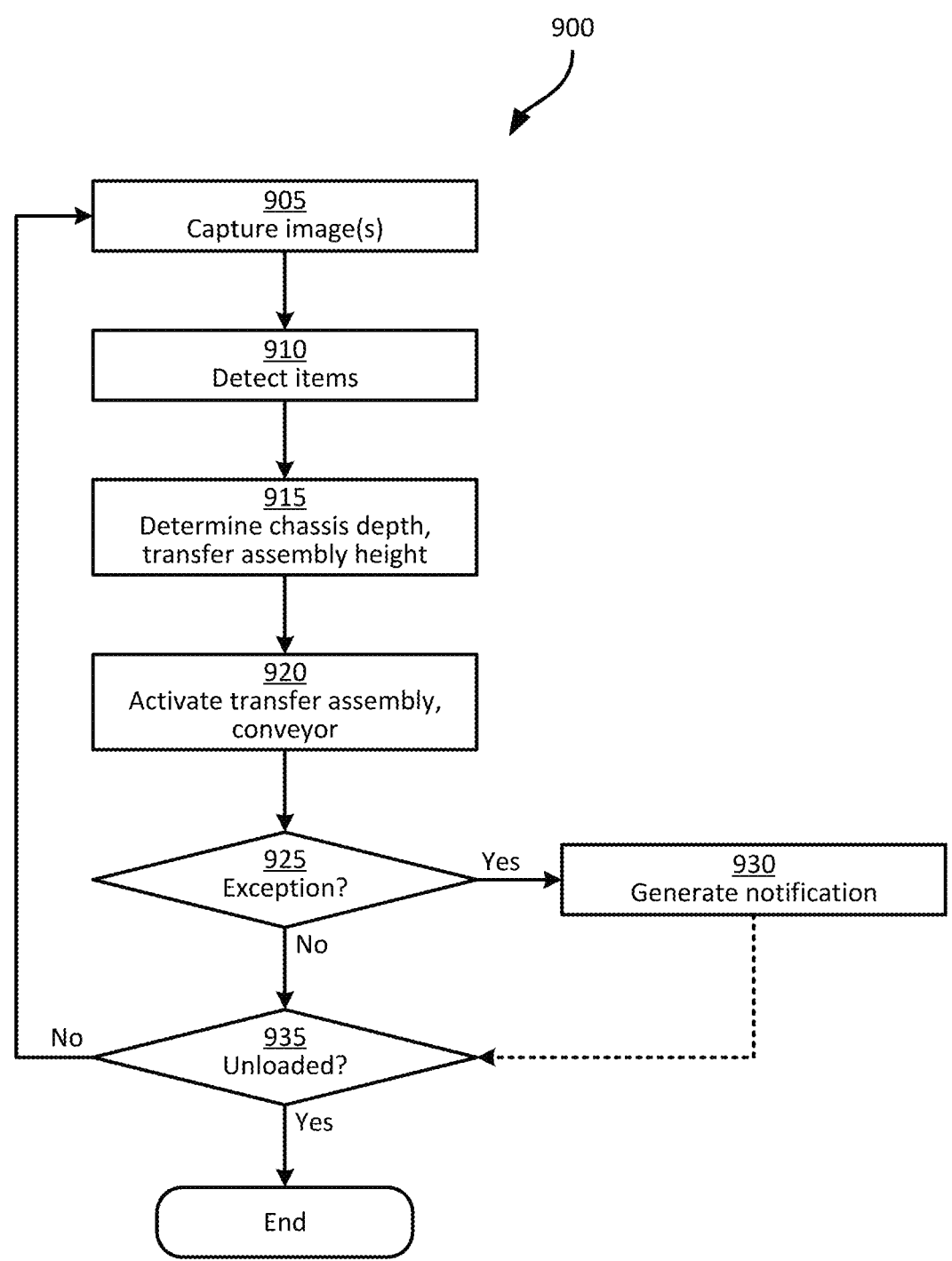
FIG. 9 is a flowchart of a method for bulk transfer-based container unloading.

Turning to FIG. 9, a method 900 of bulk transfer-based container unloading is illustrated. The method 900 is described below in conjunction with its performance by the system 200, e.g., by the controller 800 via execution of computer-readable instructions stored in a non-transitory storage medium (e.g., a memory circuit or the like) integrated with or connected to the controller 800.

At block 905, the controller 800 is configured to control the camera 812 to capture an image, e.g., by initiating the capture of a sequence of images by the camera 812. The sequence can include, for example, successive images captured at a predetermined frequency (e.g., one image every 15 seconds, although a wide variety of other capture frequencies can also be employed).

At block 910, the controller 800 is configured to detect, from a captured image, items 204 in the container 112. For example, the controller 800 can be configured to detect a forward surface of the items 204, and an upper surface substantially vertically aligned with the forward surface. In other words, the controller 800 is configured to detect a surface, defined by at least one item 204 and potentially by several items 204, with which to engage the bulk transfer assembly 240.

Figure 10:
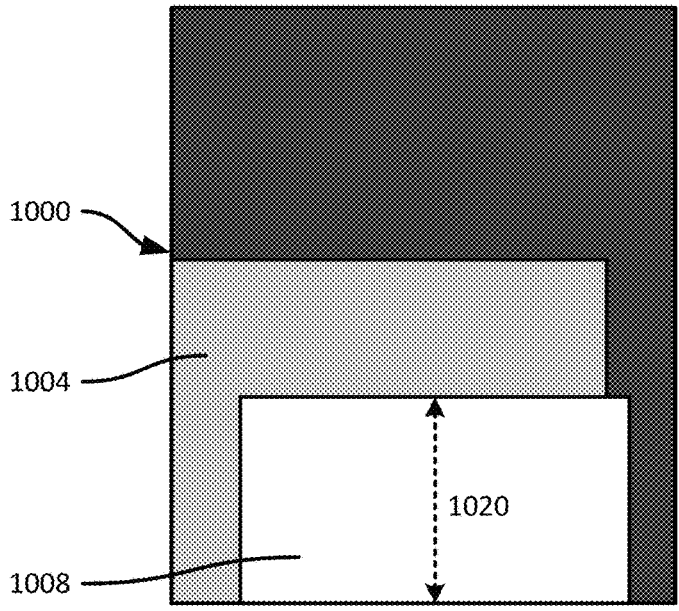
FIG. 10 is a diagram illustrating an example image captured and processed via performance of the method of FIG. 9.
Figure 10:
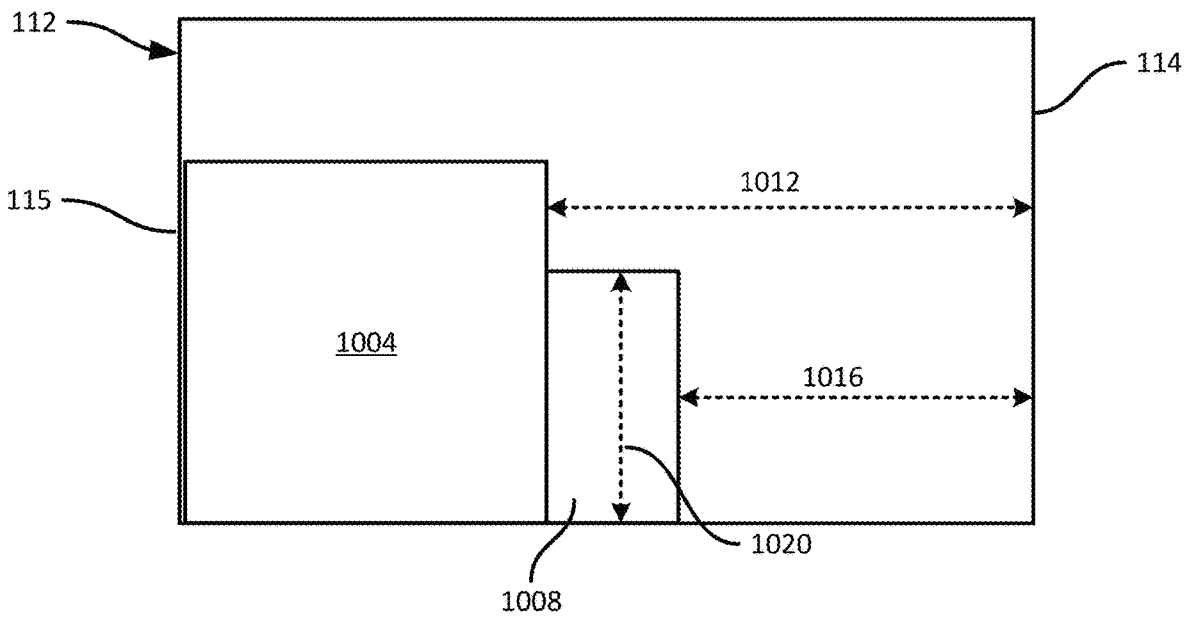

Referring to FIG. 10, an example image 1000 is shown, with areas therein shaded according to depth sensed by the camera 812. Darker areas in the image 1000 are further from the camera 812 (e.g., closer to the closed end 115 of the container 112), while lighter areas are closer to the camera 812 (e.g., closer to the open end 114 of the container 112). The image 1000 shows an aggregation 1004 of items at a first depth, and an aggregation of items 1008 at a second depth. A side view of the container 112 is also shown in FIG. 10, illustrating the depths 1012 and 1016 of the aggregations 1004 and 1008, as measured from the open end 114 of the container 112.

At block 915, the controller 800 is configured to select a chassis depth 208 within the container 112, and a height for the bulk transfer assembly 240. Specifically, the selected depth and height are determined to position the feeder 246 (or other suitable feed mechanism, such as the roller 646 or the arm 746) in engagement with the items 204. The controller 800 can, for example, select a depth corresponding to the forward surface of the items 204, e.g., the depth 1016 as shown in FIG. 10. The controller 800 can further select a height for the bulk transfer assembly 240 that places the feeder 246 at the height of the aggregation 1008 having the selected depth. Thus, the height selected at block 915 can correspond to a detected height 1020 of the aggregation 1008.

At block 920, the controller 800 can activate the bulk transfer assembly 240 and the conveyor assembly 228 (and, when the wheels 212 are driven, the locomotive hardware providing power to the wheels 212) to position the system 200 at the selected depth, and to position the bulk transfer assembly 240 at the selected height. The controller 800 can also be configured to activate components of the bulk transfer assembly 240 to begin displacing items 204 towards the conveyor assembly 228.

At block 925, the controller 800 can determine whether an exception has been detected from the images captured at block 905. When the determination at block 925 is affirmative, the controller 800 can proceed to block 930. At block 930, the controller 800 can generate a notification, e.g., via the output device 808.

Exceptions can include, for example, items 204 that are too large and/or heavy to be handled by the system 200. For example, the controller 800 can be configured to detect and dimension individual items from the images captured at block 905, and compare the dimensions of each item to predetermined thresholds. When an item 204 is detected that exceeds one or more thresholds, the controller 800 can generate an exception at block 925 and notify the worker 120 that an item 204 requires manual handling. In other embodiments, the controller 800 can compare successive images captured at block 905, and when areas of the images remain static for a threshold period of time (e.g., five frames, or another suitable period), the controller 800 can generate an exception. The static regions may indicate, for example, the presence of one or more items 204 that the bulk transfer assembly 240 was unable to move, despite engaging with those items 204.

When the determination at block 925 is negative, or following an exception-handling notification generated at block 930, the controller 800 can proceed to block 935. In some examples, the exception detected at block 925 may interrupt operation of the system 200, and the controller 800 can halt operation, rather than proceed to block 935.

At block 935, the controller 800 is configured to determine whether the container 112 is unloaded. For example, the controller 800 can be configured to process the image(s) captured at block 905 to determine whether at least a threshold portion of the closed end 115 of the container 112 (e.g., 90%) is visible in the image(s). The controller 800 can distinguish the closed end 115 from the items 204 in the container 112, for example, by applying object segmentation operations to the captured images from block 905. When the determination at block 935 is negative, the controller 800 can return to block 905 to continue the unloading process. When the determination at block 935 is affirmative, performance of the method 900 can end. For example, the controller 800 can deactivate the bulk transfer assembly 240 and the conveyor assembly 228.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Certain expressions may be employed herein to list combinations of elements. Examples of such expressions include: "at least one of A, B, and C"; "one or more of A, B, and C"; "at least one of A, B, or C"; "one or more of A, B, or C". Unless expressly indicated otherwise, the above expressions encompass any combination of A and/or B and/or C.

It will be appreciated that some embodiments may be comprised of one or more specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

The invention claimed is:

1. A system for unloading items from a container, the system comprising:
   a camera configured to capture a sequence of images of the items;
   a movable chassis configured for deployment into an open end of the container, to a selectable depth within the container;

a conveyor supported by the movable chassis, the conveyor configured to extend from an input end positioned within the container according to the selectable depth to an output end external to the container;

a bulk transfer assembly supported by the movable chassis at the selectable depth and an adjustable height, the bulk transfer assembly including:

(i) a feeder configured to engage with the items and displace a portion of the items towards the conveyor, and (ii) a collector configured to receive and direct the displaced items to the input end of the conveyor for transport to the output end of the conveyor;

a controller configured to:

detect, from the sequence of images, an item incompatible with the bulk transfer assembly; and generate a notification in response to detecting the incompatible item.

2. The system of claim 1, wherein the bulk transfer assembly further includes:

a movable barrier configured to extend from a lower end adjacent to a floor of the container, to an upper end adjacent to the collector, the barrier configured to stabilize items below the collector.

3. The system of claim 2, wherein the barrier includes a flexible sheet slidable along a lower portion of the movable chassis to adjust the height of the upper end.

4. The system of claim 1, wherein the movable chassis includes a frame supporting the conveyor and the bulk transfer assembly.

5. The system of claim 4, wherein the movable chassis includes a pair of rails supporting the bulk transfer assembly, and a height of the feeder and the collector is adjustable along the pair of rails.

6. The system of claim 1, wherein the collector includes a forward end having a first width configured to receive the displaced items, and a rear end adjacent to the input end of the conveyor, the rear end having a second width smaller than the first width.

7. The system of claim 6, wherein the second width of the collector is substantially equal to a width of the conveyor.

8. The system of claim 1, wherein the collector includes a conveyor belt to direct the displaced items towards the input end of the conveyor.

9. The system of claim 1, wherein the feeder includes an inverted conveyor configured to engage the items.

10. The system of claim 1, wherein the feeder includes a roller configured to engage the items.

11. The system of claim 1, wherein the feeder includes a reciprocating arm configured to engage the items.

12. The system of claim 1, wherein the controller is further configured to:

detect, from the sequence of images, at least one of a depth and a height of the items; and determine the selectable depth for the movable chassis, and the adjustable height for the bulk transfer assembly.

13. The system of claim 1, wherein the controller is configured to detect the incompatible item by:

determining that a region depicting items in the sequence of images remains static for a period of time exceeding a threshold.

14. A method, comprising:

controlling a camera to capture an image of an aggregation of items in a container;

detecting a forward surface and an upper surface of the aggregation of items from the image;

positioning a movable chassis at a selectable depth within the container according to the detected forward surface and the detected upper surface;

positioning a bulk transfer assembly to a selected height according to the detected upper surface;

activating a feeder of the bulk transfer assembly to displace items onto a collector towards a conveyor; and activating the conveyor to transfer the displaced items from the container;

detecting an incompatible item; and controlling an output device to generate a notification.

15. The method of claim 14, further comprising:

repeating the detection of the forward surface and the upper surface, and positioning the movable chassis at an updated selectable depth.

16. The method of claim 14, wherein activating the feeder includes activating a roller configured to engage the items.

17. The method of claim 14, wherein activating the feeder includes:

positioning an inverted conveyor at the upper surface of the items; and activating the inverted conveyor.

18. The method of claim 14, further comprising:

determining that unloading of the container is complete; and deactivating the feeder and the conveyor.

* * * * *